(12) United States Patent
Su

(10) Patent No.: US 6,742,442 B1
(45) Date of Patent: Jun. 1, 2004

(54) COFFEE MAKER STRUCTURE

(75) Inventor: Yung Sen Su, Tainan (TW)

(73) Assignee: Chang Yue Industrial Corp., Tainan (TW)

( * ) Notice: Subject to any disclaimer, the term of this patent is extended or adjusted under 35 U.S.C. 154(b) by 0 days.

(21) Appl. No.: 10/618,607

(22) Filed: Jul. 15, 2003

(51) Int. Cl.[7] .............................. A23L 1/00; A47J 31/02
(52) U.S. Cl. .............................. 99/281; 99/284; 99/285; 99/297; 99/299; 99/306; 99/323; 99/495
(58) Field of Search .......................... 99/495, 452, 453, 99/280–284, 285, 299, 297, 304–306, 317, 319, 279, 323, 323.3, 510; 210/474, 181, 477–479; 426/433, 435, 432, 429

(56) References Cited

U.S. PATENT DOCUMENTS

| 5,363,745 A | * | 11/1994 | Lin | 99/306 |
| 5,370,041 A | * | 12/1994 | Lowe | 99/286 |
| 5,632,194 A | * | 5/1997 | Lin | 99/285 |
| 5,725,765 A | * | 3/1998 | Shen | 210/238 |
| 5,826,493 A | * | 10/1998 | Tien Lin | 99/306 |
| 5,895,595 A | * | 4/1999 | Haden | 219/432 |
| 6,058,827 A | * | 5/2000 | Lin Tien | 99/299 |
| 6,164,190 A | * | 12/2000 | Tien Lin | 99/299 |
| 6,327,965 B1 | * | 12/2001 | Lin Tien | 99/299 |
| 6,343,542 B1 | * | 2/2002 | Shen | 99/299 |
| 6,477,942 B1 | * | 11/2002 | Guu | 99/285 |
| 6,494,128 B1 | * | 12/2002 | Yu | 99/285 |
| 6,550,371 B1 | * | 4/2003 | Del Bon et al. | 99/295 |

* cited by examiner

Primary Examiner—Timothy F. Simone
(74) Attorney, Agent, or Firm—Leong C. Lei

(57) ABSTRACT

A coffee maker structure is disclosed. The coffee maker comprises a base seat, a water container and a siphoning tube container. The ends provided on the base seat connect electricity to the heating base seat and a sensing switch to boil water. The siphoning tube container is with a powder isolation pad and contains coffee powder. The siphoning tube passes through to the water container. Steam is passed through the siphoning tube to the siphoning tube container to the coffee powder. The heating base seat generates heat and switches on the sensing switch to cut off the electric power of the base seat. The temperature of the water container is lowered and water is recycled to the water container.

4 Claims, 7 Drawing Sheets

COFFEE MAKER STRUCTURE

BACKGROUND OF THE INVENTION (a) Technical Field of the Invention

The present invention relates to a coffee maker, and in particular, an electric coffee-maker which automatically brews coffee beverage and at the same time provides the function of an electric kettle.

(b) Description of the Prior Art

FIGS. 1, 2 and 3 depict conventional coffee maker made from glass. As shown in FIG. 1, the coffee maker D comprises a base seat D1, a ball-like container D2, a siphoning tube container D3 and a powder isolation pad B. FIGS. 2 and 3 show the implementation of the conventional coffee maker D. The top end of the base seat D1 is connected to the opening D21 of the ball-like container D2. Water A is added to the container D2 and the bottom end of the container D2 is burnt with a burner D4. When the water A is boiled, the siphoning tube D31 and the opening D21 of the rubber ring D32 is passed through the ball-like container D2. The opening D21 is connected to the siphoning tube D31, and the siphoning tube D31 is the only opening to the external of the ball-like container D2. The powder-isolation pad B is placed with coffee powder C and the boiled water will rise through the siphoning tube D31 to boil the coffee powder for 30 to 45 seconds. The burner D4 is then removed and the pressure within the ball-like container D2 is reduced. The boiled water A will flow to the container D2 and boil the coffee powder again. If a cup of coffee is needed, the coffee A is poured to another container. The above coffee maker is restricted to brewing of coffee and all the components such as ball like container D2 and the siphoning container D3 are fragile. Further the use of burner D4 is also rather dangerous as accidental fire may occur. In view of the above, it is an object of the present invention to provide a coffee-maker structure which can mitigate the above drawbacks.

SUMMARY OF THE INVENTION

It is an object of the present invention to provide a coffee maker comprising a base seat including a base tray and a top seat having two end holes, wherein a circuit board and a conductive device are provided to the combination of the base tray and the top seat and the top end of the conductive device is provided with two ends, and the two ends are protruded beyond the end holes of the top seat; a water container having a bottom end combined with a heating base seat and a conductive ring seat, wherein the interior heating seat is connected to a heater and the bottom of the heating seat is connected to a sensing switch, and the bottom section of the conductive ring seat is provided with end through holes having upper ends correspondingly mounted to a conductive plate module, and the two ring seat ends are provided for the two ends to contact with the conductive plate module, and the conductive plate module is connected to the heater and the sensing switch, the top end of the water container being a through hole; and a siphoning container having in sequence a cavity with a bottom end connected with a tightening ring externally fitted with an air-sealing ring, and a siphoning tube being provided to the through hole of the top end of the water container, and for air sealing ring and correspondingly connected to the siphoning tube, and the through hole being tightly sealed with the air sealing ring.

Yet a further object of the present invention is to provide a coffee maker structure, wherein ends provided on the base seat connect electricity to the heating base seat and a sensing switch to boil water. The siphoning tube container is with a powder isolation pad and contains coffee powder. The siphoning tube passes through to the water container. Steam is passed through the siphoning tube to the siphoning tube container to the coffee powder. The heating base seat generates heat and switches on the sensing switch to cut off the electric power of the base seat. The temperature of the water container is lowered and water is recycled to the water container.

Still a further object of the present invention is to provide a coffee maker structure, wherein the top seat of the base seat is a recess mounted with a protruded chamber with two end holes for the protruding of the ends, the bottom end of the water container is positioned at the recess and the conductive ring seat corresponding to the protruded chamber of the base seat is a cavity having two through holes for the end to pass through and contacts with the conductive plate module at the top end of the cavity.

Yet a further object of the present invention is to provide a coffee maker structure, wherein the top end of the cavity is provided with a cover body having a center mounted downwardly with a siphoning tube cover, and the siphoning tube cover is positioned upward and is for the insertion of the siphoning tube.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention.

Various changes to the described embodiments may be made in the function and arrangement of the elements described without departing from the scope of the invention as set forth in the appended claims.

Figure 1:
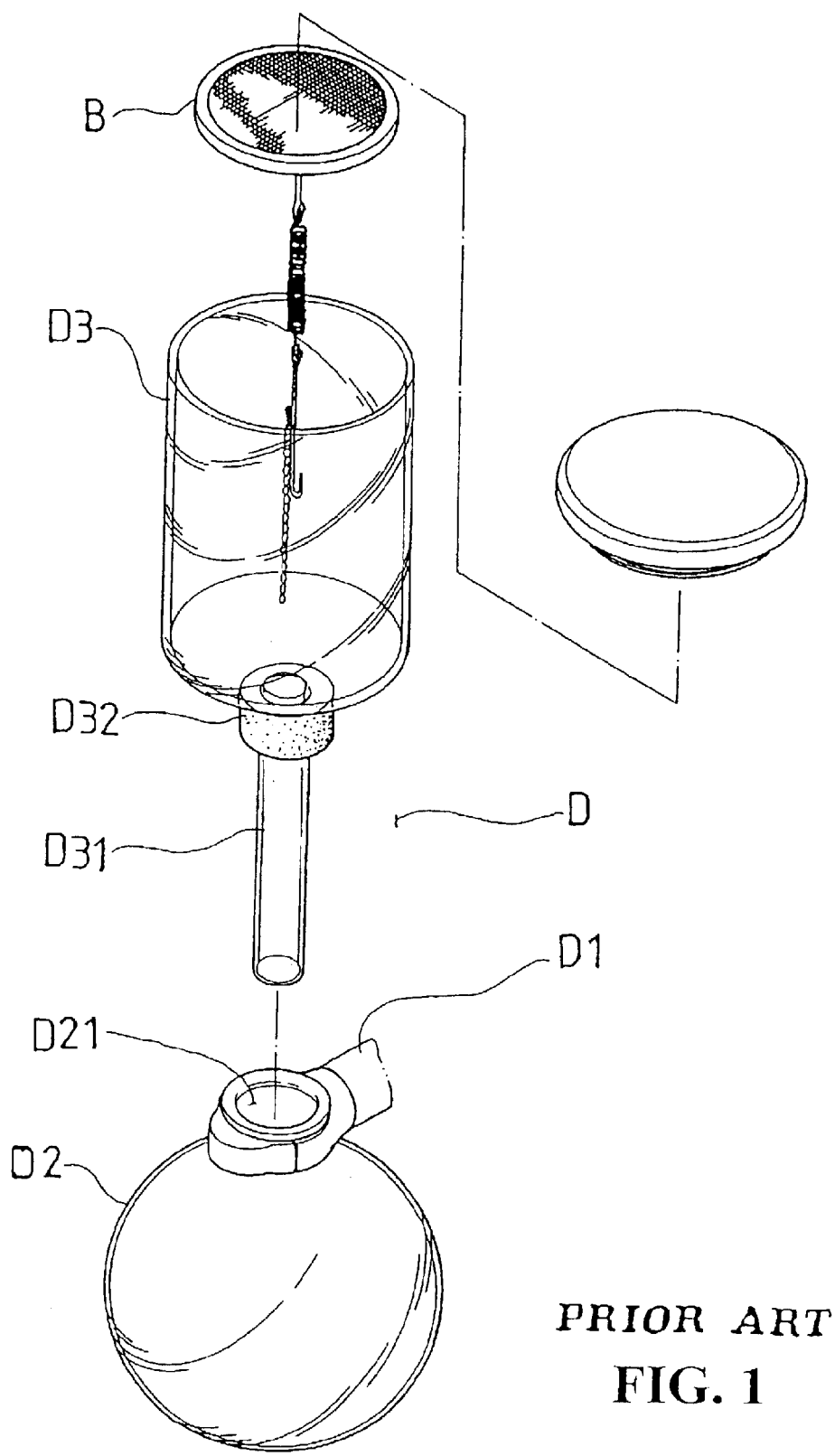
FIG. 1 is a partial perspective view of a conventional coffee maker.
Figure 2:
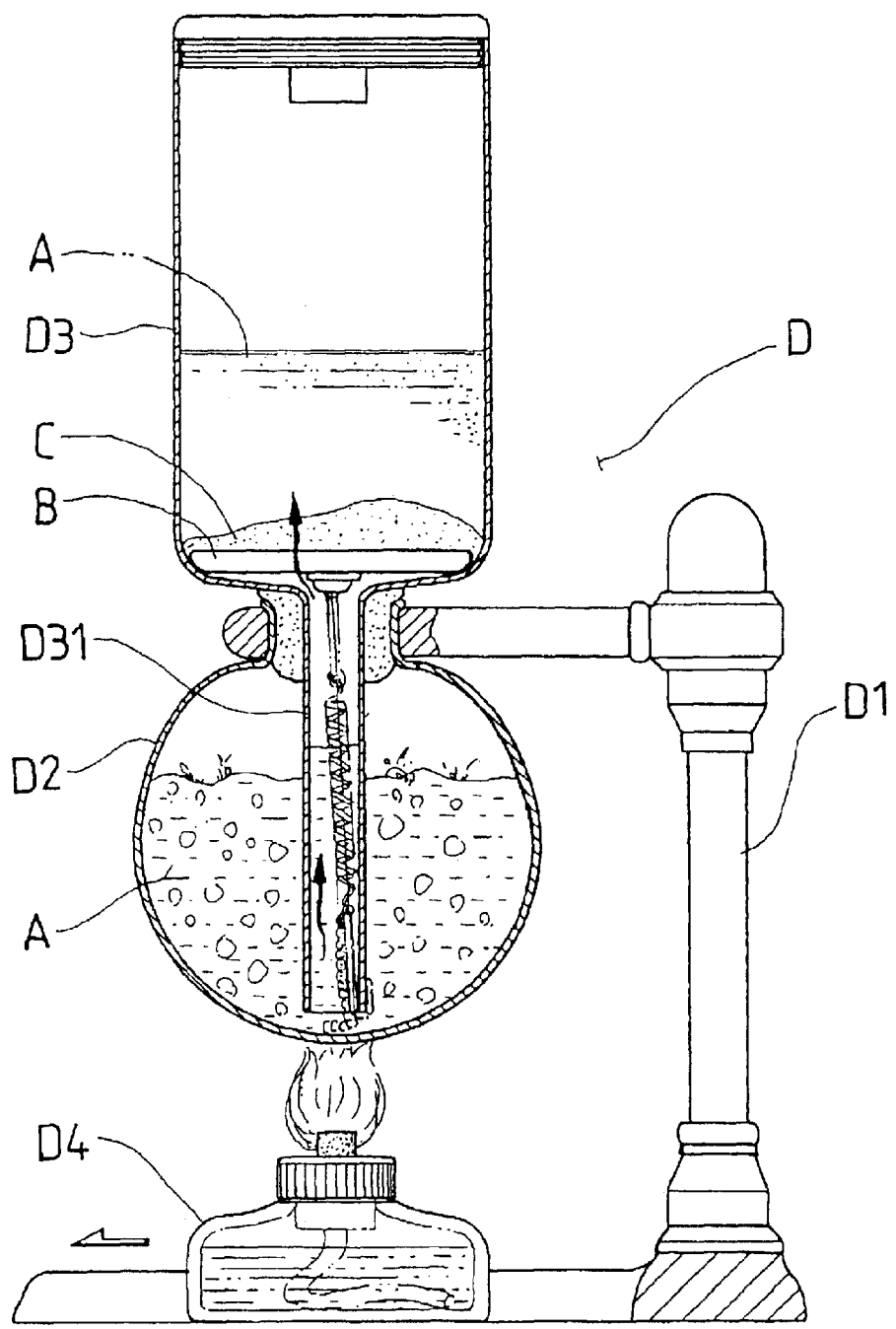
FIG. 2 is a heating module of the conventional coffee maker.
Figure 3:
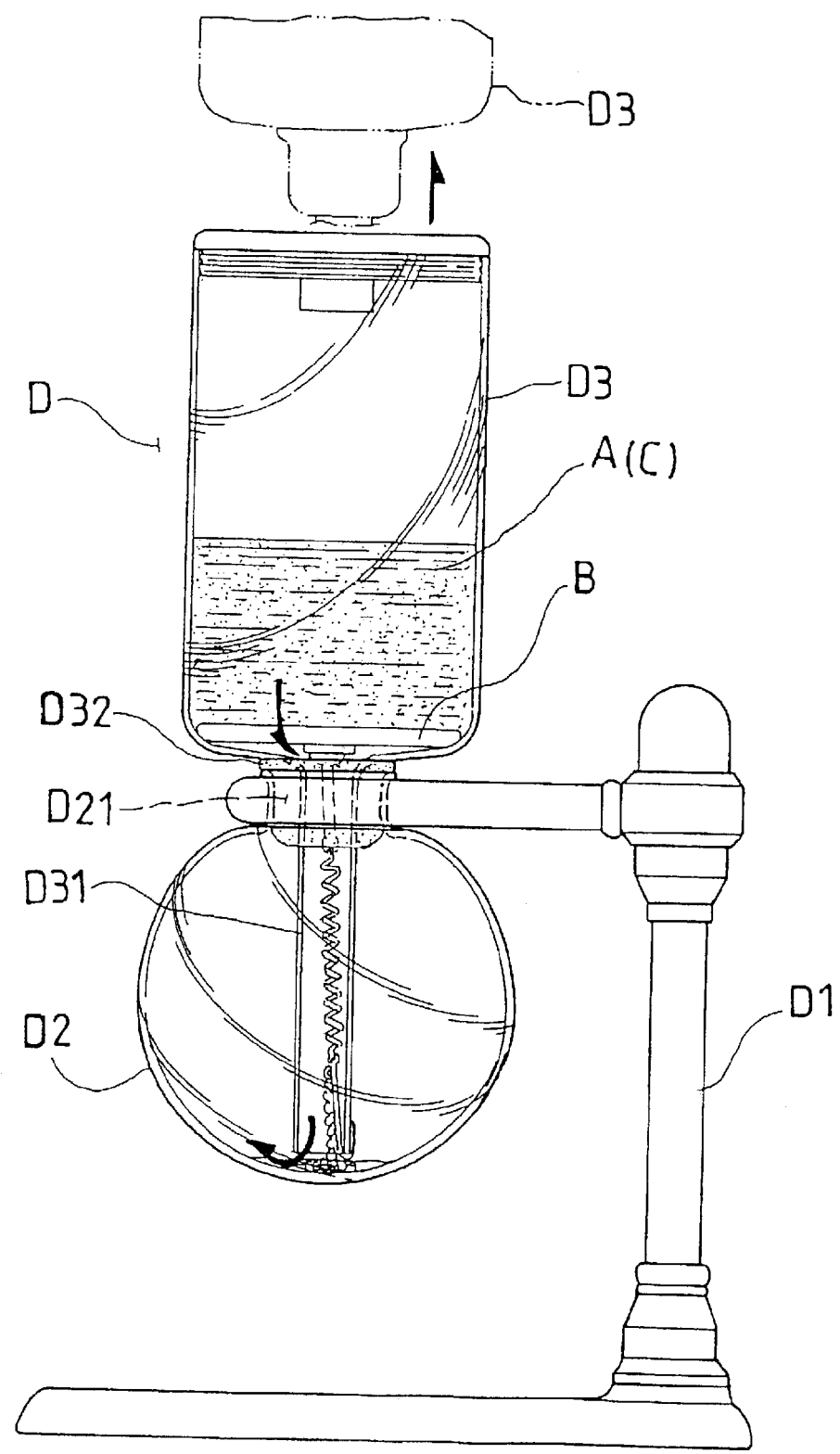
FIG. 3 is a schematic view of a conventional coffee maker.
Figure 4:
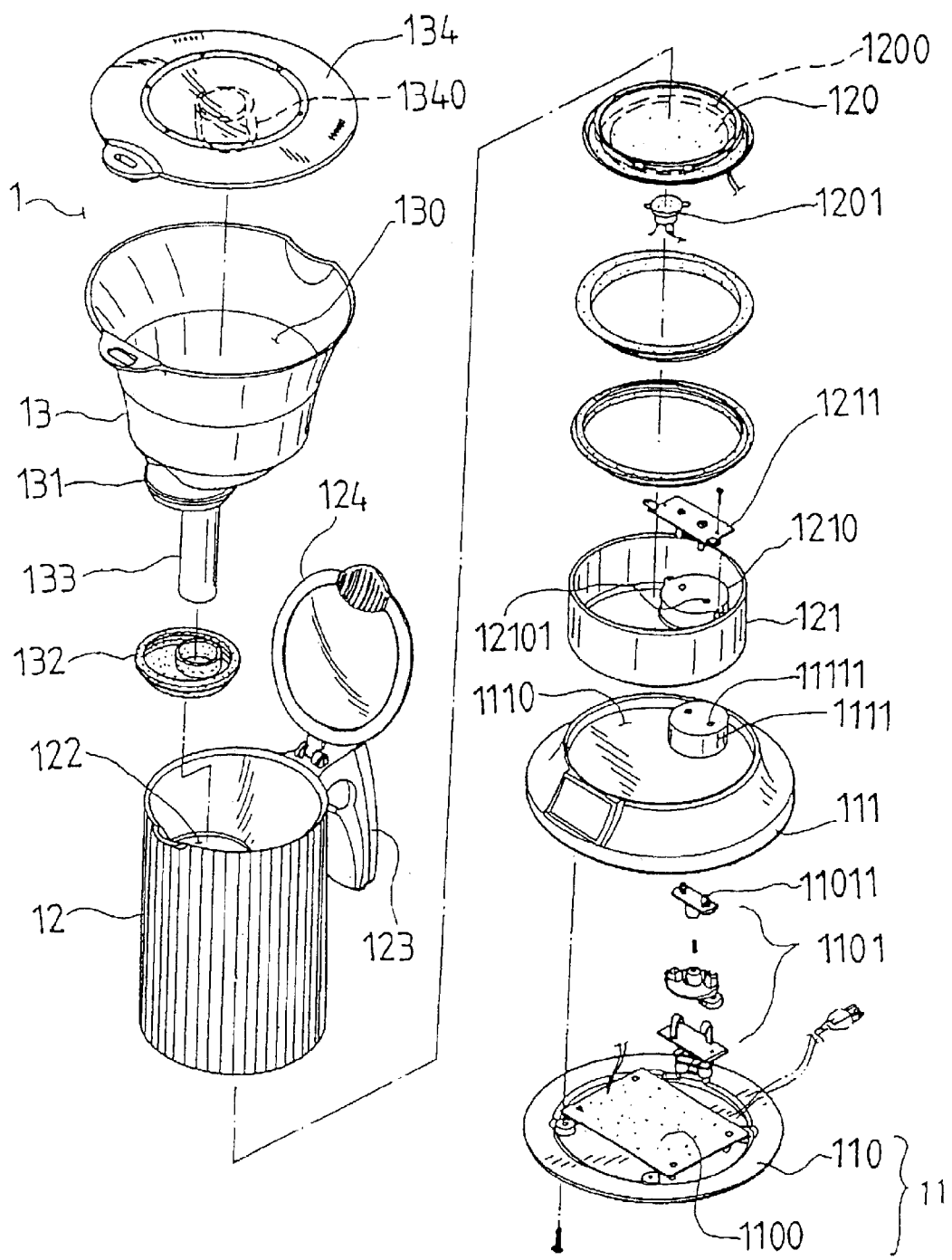
FIG. 4 is a perspective exploded view of a coffee maker of the present invention.

Referring to FIGS. 4, 5, 5A, 6 and 7, there is shown another preferred embodiment of the present invention. As shown in FIG. 4, the coffee maker 1 comprises a base seat 11 connected to a plastic water container 12 at the top section thereof. The top section of the water container 12 is connected to a siphoning tube container 13. The base seat 11 includes a base tray 110 and a top seat 111 wherein the top seat is provided with a recess 1110 having a protruded chamber 1111 thereon. Two end holes 11111 are provided on the protruded chamber 1111, and the interior of the base tray 110 and the top seat 111 contain a circuit board 1100 and a conductive device 1101. The top end of the conductive device 1101 is provided with two ends 11011 which are protruded above the end holes 11111 of the top seat 111.

The bottom end of the water container 12 is provided with a heating base seat 120 and a conductive ring seat 121. The interior of the heating base seat 120 is connected to a heater 120 and the bottom end is connected to a thermal sensing switch 1201. The bottom portion of the conductive ring seat 121, corresponding to the protruded chamber 1111, is provided with a protruded chamber 1201. The top end of the protruded chamber 1201 is provided with two through holes 12101 for the insertion of the ends 11011. The top end of the through holes 12101 is corresponding to the conductive plate module 1211. The bottom face of the conductive plate module 1211 is in contact with the end 11011, and the conductive plate module 1211 is connected to the heater 1200 and the thermal sensing switch 1201. Further, the top end of the water container 12 is a guiding hole 122. The top end of the circumferential edge of the water container 12 is provided with a handle 123 pivotally connected with a cover 124.

The siphoning container 13 has an opened cavity 130, and the bottom end of the cavity 130 is provided with a tightening ring 131. The external cover of the tightening ring 131 is mounted with an air-sealing ring 132. The air-sealing ring 131 and the bottom end of the air-sealing ring 131 have a siphoning tube 133. Further, the guiding hole 122 is used for the connection of the tightening ring 131, the air-sealing ring 132 and the siphoning tube 133. The guiding hole 122 is sealing connected with the air-sealing ring 132. The top end of the cavity 130 has a cap body 134.

The center of the cover body 134 is downwardly mounted with a siphoning tube cover 1340.

Figures 5, 5A:
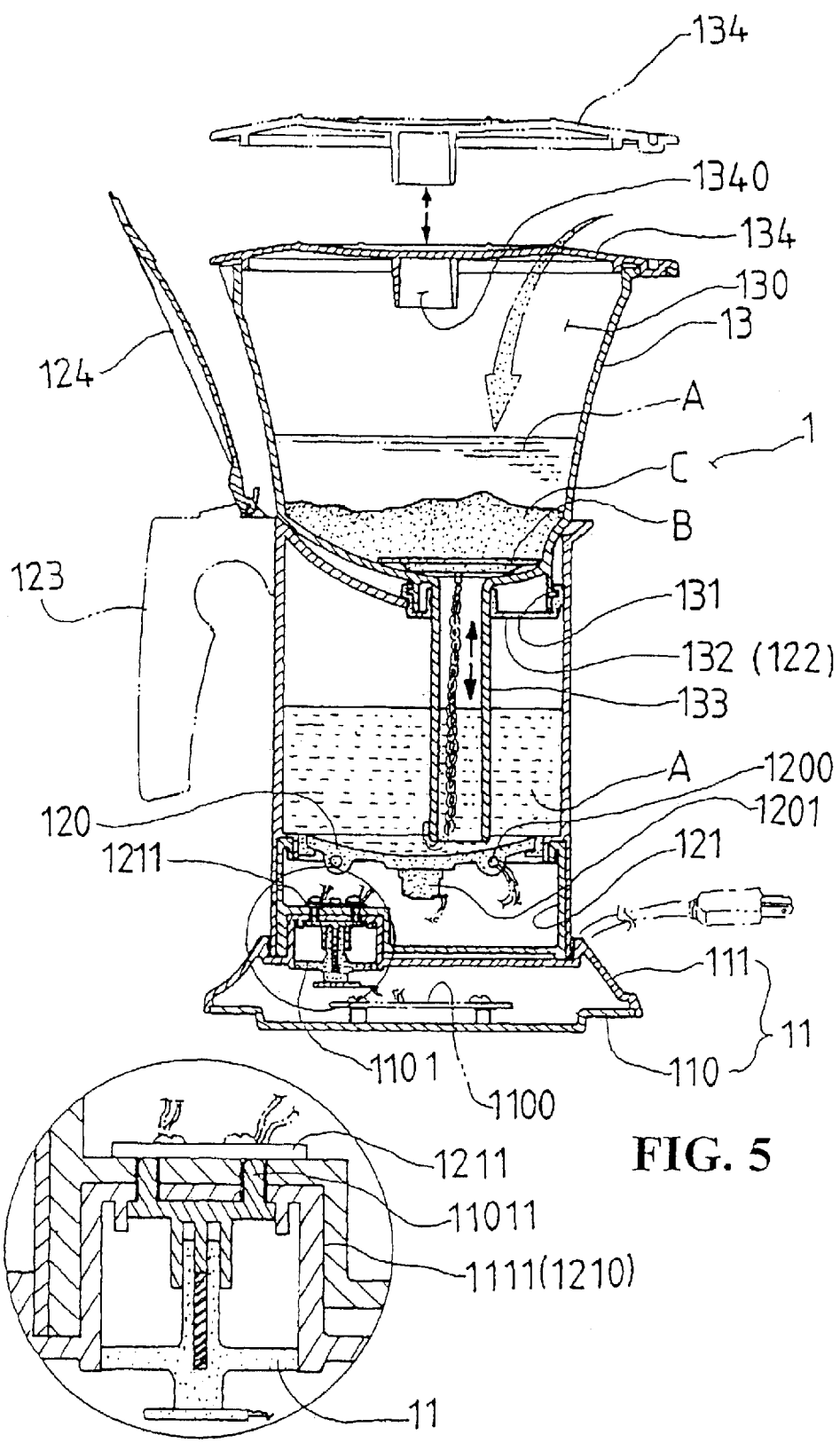
FIG. 5 is a schematic view of a coffee maker of the present invention.
FIG. 5A is an enlarged view of a portion of FIG. 5.

Referring to FIG. 5, the coffee maker 1 uses the circuit board 1100 of the base seat 11 to control the circuit and is used to connect the conductive device 1101 and the end 11011. The end 11011 is upwardly mounted to contact with the conductive plate module 1211. The conductive plate module 1211 transfers electricity to the heater 1200 and the thermal sensing switch 1201. Water A is placed into the water container 12 for boiling. The interior of the siphoning tube container 13 is mounted with a powder isolation pad B and is placed with coffee powder C. The tightening ring 131, the air-sealing ring 132 and the siphoning tube 133 are correspondingly connected to the guiding hole 122. The guiding hole 122 is sealed with the air-sealing ring 132 such that the siphoning tube 133 is the only passage to the external for the water container 12. The pressure produced by the vapor of the water container 12 to deliver water A via the siphoning tube 133 to the siphoning tube container 13 and is dissolved with the coffee powder C. At this instance, the water container 12 is in a vacuum state and the temperature of the base seat 120 is increased and the thermal sensing switch 1201 is switched on. The switching on of the switch 1201 will cut off the power source of the heater 1200 and heating is therefore cut off. The temperature of the water container 12 is lowered and the pressure is reduced and water A is again flowing back to the water container 12.

Figure 6:
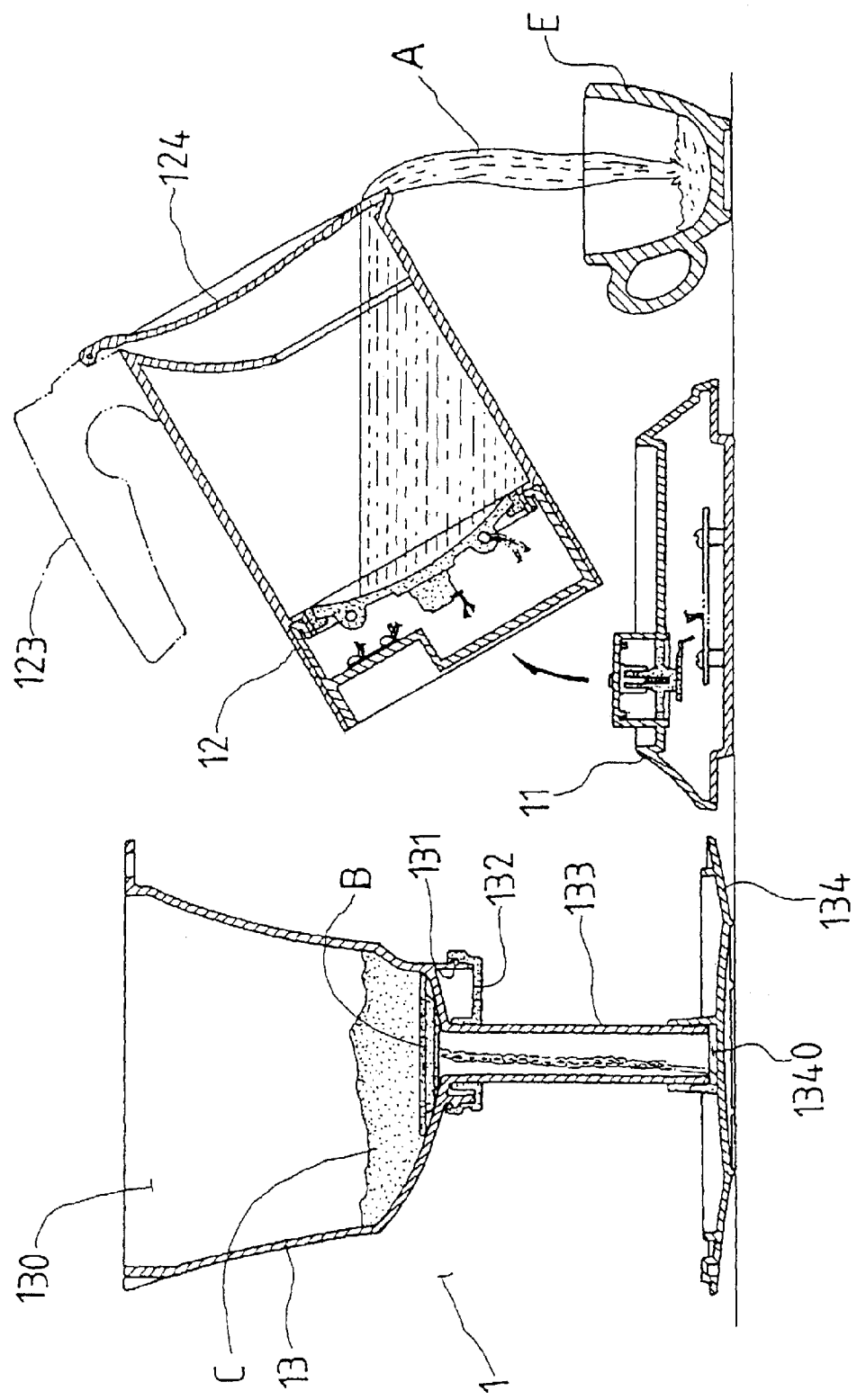
FIG. 6 is sectional view showing the coffee maker of the present invention.

Referring to FIG. 6, the coffee maker 1 is placed horizontally with the cap body 134 being placed on a platform. The siphoning tube cover 1340 faces upward, and the siphoning tube container 13 is removed from the water container 12. The siphoning tube cover 1340 is used for the connection with the siphoning tube 133 of the siphoning tube container 13. The handle 123 allows the water container 12 to disengage from the base seat 11, and the coffee maker A within the water container can be placed slanting to the coffee cup.

Figure 7:
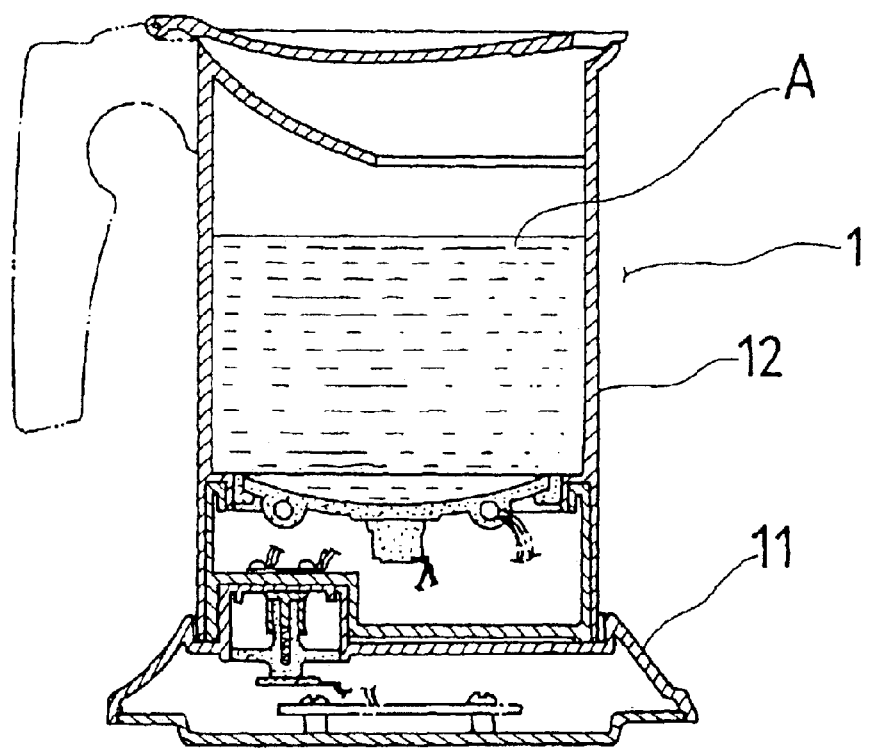
FIG. 7 is another preferred embodiment of the present invention.

Referring to FIG. 7, the water container 12 can be placed onto the base seat 11 for separate boiling of water in the water container 12.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A coffee maker comprising:
   (a) a base seat including a base tray and a top seat having two end holes, wherein a circuit board and a conductive device are provided to the combination of the base tray and the top seat, and the top end of the conductive device is provided with two ends, and the two ends are protruded beyond the end holes of the top seat;
   (b) a water container having a bottom end combined with a heating base seat and a conductive ring seat, wherein the interior heating seat is connected to a heater and the bottom of the heating seat is connected to a sensing switch, and the bottom section of the conductive ring seat is provided with end through holes having upper ends corresponding mounted to a conductive plate module, and the two ring seat ends are provided for the two ends to contact with the conductive plate module, and the conductive plate module is connected to the heater and the sensing switch, the top end of the water container being a through hole; and
   (c) a siphoning container having in sequence a cavity with a bottom end connected with a tightening ring externally fitted with an air-sealing ring, and a siphoning tube being provided to the through hole of the top end of the water container, and for air sealing ring and corresponding connected to the siphoning tube, and the through hole being tightly sealed with the air sealing ring.

2. The coffee maker of claim 1, wherein the top seat of the base seat is a recess mounted with a protruded chamber with two end holes for the protruding of the ends, the bottom end of the water container is positioned at the recess and the conductive ring seat corresponding to the protruded chamber of the base seat is a cavity having two through holes for the end to pass through and contacts with the conductive plate module at the top end of the cavity.

3. The coffee maker of claim 1, wherein the top end of the circumferential edge of the water container is provided with a handle pivotally connected to the top cover of the water container.

4. The coffee maker of claim 1, wherein the top end of the cavity is provided with a cover body having a center mounted downwardly with a siphoning tube cover, and the siphoning tube cover is positioned upward and is for the insertion of the siphoning tube.

* * * * *